United States Patent [19]

Ino et al.

[11] Patent Number: 5,286,693
[45] Date of Patent: Feb. 15, 1994

[54] METHOD OF PRODUCING CATALYST FOR CONVERTING HYDROCARBONS

[75] Inventors: Takashi Ino, Kawasaki; Kazumasa Hamatani, Yokohama; Nobuyuki Miyajima, Kawasaki; Kazuya Nasuno, Yokohama, all of Japan

[73] Assignee: Nippon Oil Co., Ltd., Tokyo, Japan

[21] Appl. No.: 971,200

[22] Filed: Nov. 4, 1992

[30] Foreign Application Priority Data

Nov. 6, 1991 [JP] Japan ................... 3-290111

[51] Int. Cl.$^5$ ................ B01J 29/06; B01J 37/28
[52] U.S. Cl. ......................... 502/68; 502/64
[58] Field of Search .............. 502/68, 64; 208/114

[56] References Cited

U.S. PATENT DOCUMENTS

| | | | |
|---|---|---|---|
| 4,430,199 | 2/1984 | Durante et al. | 208/114 |
| 4,840,724 | 6/1989 | Groenenboom et al. | 502/68 |
| 4,970,183 | 11/1990 | Nakamoto et al. | 502/68 |
| 4,975,180 | 12/1990 | Eberly | 208/114 |
| 4,988,654 | 1/1991 | Kennedy et al. | 502/68 |
| 5,071,806 | 12/1991 | Pecoraro | 502/68 |

*Primary Examiner*—Carl F. Dees
*Attorney, Agent, or Firm*—Keil & Weinkauf

[57] ABSTRACT

A method of producing a catalyst for converting hydrocarbons involves spray-drying a slurry containing crystalline aluminosilicate zeolite and magnesium silicate mineral. The magnesium silicate mineral functioning as a metal trap contains 10 to 60 wt % of magnesium as an oxide. The magnesium silicate mineral has been treated with a phosphorus-containing solution.

19 Claims, No Drawings

METHOD OF PRODUCING CATALYST FOR CONVERTING HYDROCARBONS

BACKGROUND OF THE INVENTION

This invention relates to a method of producing a catalyst for converting hydrocarbons. More particularly, it relates to a method of producing a catalyst for converting hydrocarbons exhibiting outstanding effects as a fluidized catalytic cracking catalyst for producing light oils, such as gasoline or kerosene, by catalytic cracking of heavy oils containing at least nickel and vanadium, among heavy metals comprised of nickel, vanadium, iron and copper in an amount of 0.5 ppm or more as a sum total of the contents of nickel and vanadium.

In catalytic cracking in general, petroleum hydrocarbons are cracked by being contacted with a catalyst to produce a larger amount of light fractions such as LPG and gasoline and a small amount of cracked light oils, and the coke deposited on the catalyst is burned off with air for circulation and re-use of the catalyst. As starting oils, distillates such as light gas oil (LGO) or heavy gas oil (HGO) from an atmospheric distillation tower and vacuum gas oil (VGO) from a vacuum distillation tower are mainly employed.

However, since heavy oils tend to be supplied in surplus due to the world-wide tendency towards heavy crude oils and changes in the demand structure, it becomes necessary to use heavy oils containing distillation residues as the starting oil for catalytic cracking.

However, larger quantities of metals such as nickel, vanadium, iron, copper or sodium are contained in heavy oils containing distillation residues than in distillates. These metals are known to be deposited on catalysts to seriously impede cracking activity and selectivity. That is, the conversion is lowered with deposition of metals on the catalysts. On the other hand, hydrogen and coke are significantly increased to render the system operation difficult as well as to lower the yield of desirable liquid products.

For diminishing the effects of these pollutant metals, there have hitherto been proposed a method of employing a catalyst containing a metal trap or a method of physically mixing discrete particles containing a metal trap with a cracking catalyst. Compounds of alkaline earth elements are known to be effective as the metal trap. For example, Japanese Laid-open Patent Application No.1-146989 discloses using oxides of alkaline earth metals carried by silica. Japanese Laid-open Patent Applications Nos.63-8481, 62-213843 and 61-21191 disclose using magnesium compounds, whereas Japanese Laid-open Patent Application Nos.61-204041 and 60-71041 disclose using calcium compounds. Although the compounds of alkaline earth metals are effective as a metal trap, these compounds are disadvantageous in that they are adsorbed on zeolite which is an active component in the catalyst to lower the hydrothermal stability of the catalyst. On the other hand, silica sol or alumina sol used as a material of catast binder is stable only in an acidic solution so that upon preparation of a catalyst, the addition of basic alkaline earth compounds to a sol-containing slurry results in gelation of the binder before spray-drying to lower the attrition resistance of the catalyst. For overcoming these drawbacks, the catalysts containing the compounds of alkaline earth metals as the metal trap are used as physical mixtures of diluent particles containing the metal trap and particles of the cracking catalysts containing zeolite. However, for diminishing the effects of pollutant metals, it is more effective that the metal trap and zeolite be contained in one and the same particle. Japanese Laid-open Patent Application Nos.61-278351 and 63-123804, for example disclose building zeolite and the magnesium compounds as the metal trap in one and the same particle. However, in the conventional catalysts containing the magnesium compounds and zeolite in one and the same particle, the adverse effects which the magnesium compound might have on zeolite have not been studied with satisfactory results.

SUMMARY OF THE INVENTION

It is an object of the present invention to provide a method of producing a catalyst suited for conversion of hydrocarbon oils.

It is another object of the present invention to provide a method of producing a catalyst for catalytic cracking which exhibits high resistance to metals and which when used for cracking heavy oils containing 0.5 ppm or more of heavy metals such as nickel, vanadium or iron, affords a high gasoline yield and a high gasoline octane value and is capable of suppressing the yield of hydrogen or coke.

These and other objects of the invention will become apparent from the following description.

In accordance with the present invention, there is provided a method of producing a catalyst for converting hydrocarbons comprising spray-drying a slurry containing crystalline aluminosilicate zeolite and magnesium silicate mineral, the magnesium silicate mineral functioning as a metal trap containing 10 to 60 wt % of magnesium as an oxide, the magnesium silicate mineral having been treated with a phosphorus-containing solution.

DESCRIPTION OF PREFERRED EMBODIMENTS

The present invention will be explained in more detail hereinbelow.

According to the method of the present invention, a catalyst for converting hydrocarbons is produced by spray-drying a slurry containing crystalline aluminosilicate zeolite and a particular metal trap material.

According to the present invention, the particular metal trap material contained in the above slurry is magnesium silicate minerals containing 10 to 60 wt % of magnesium as oxides, such as serpentine, olivine, augite, amphibole or sepiolite, or serpentine, olivine, etc. containing these minerals as main constituent minerals. Alternatively, forsterite or enstatite produced on calcining the minerals of magnesium silicates may also be employed. Most preferred of the magnesium silicate minerals are serpentine and sepiolite. If calcining of the magnesium silicate minerals is carried out at elevated temperatures, the surface area of the minerals used as the metal trap material is decreased. For this reason, the magnesium silicate minerals calcined at a temperature not exceeding 800° C. are most preferred. Although there is no particular limitation to the particle size of the particular metal trap material, it may preferably be 40 µm or less for improving the metal trapping capability and attrition resistance.

According to the present invention, the metal tap material is treated with a phosphorus-containing solution before being mixed with crystalline aluminosilicate zeolite to be later described. The phosphorus-containing solution may be enumerated by an aqueous solution of phosphoric acid, a mixed aqueous solution of phosphoric acid and ammonia, an aqueous solution of ammonium phosphate, an aqueous solution of ammonium dihydrogen phosphate and an aqueous solution of diammonium hydrogen phosphate. The metal trap material may be treated with the phosphorus-containing solution by dispersing the metal trap material in the phosphorus-containing solution which is adjusted so that pH of the as-treated phosphorus-containing solution is in a range of 1 to 4 and preferably 2 to 3.5, or by dispersing the metal trap material in pure water and adding a phosphorus compound to the resulting dispersion. The amount of the phosphorus-containing solution with respect to the metal trap material may preferably be in a range of 0.5 to 20 parts by weight and preferably 1 to 10 parts by weight based on 100 parts by weight of the metal trap material.

According to the present invention, the crystalline aluminosilicate zeolite contained in the slurry along with the metal trap material is natural or synthetic crystalline aluminosilicate zeolite having a three-dimensional skeleton structure and preferably having a porous structure with a uniform pore size on the order of about 0.4 to 1.5 nm. The natural crystalline aluminosilicate zeolite may be enumerated by, for example gmelinite, chabazite, dachiardite, clinoptilolite, faujasite, heulandite, analcite, levynite, erionite, sodalite, cancrinite, ferrierite, brewsterite, offretite, natrolite and mordenite. Faujasite is most preferred. The synthetic crystalline aluminosilicate zeolite may be enumerated by zeolite X, Y, A, L, ZK-4, B, E, F, HJ, M, Q, T, W, Z, $\alpha$, $\beta$, ZSM and $\omega$. Above all, Y- and X-zeolite or a mixture thereof are most preferred. An ultra-stable Y-type (USY) zeolite, with a lattice constant of 2.425 to 2.460 nm obtained by abstracting aluminum from Y-type zeolite is most preferred.

Sodium ions or protons in the aforementioned zeolite may be exchanged with other cations. Ion exchange with a monovalent lithium ion or a multivalent cation leads to improved hydrothermal stability of zeolite. The multivalent cations may include bivalent calcium cations, bivalent cations of magnesium, bivalent cations of Fe, trivalent cations of Fe, bivalent cations of Mn, and ions of rare earth elements such as Ce, La, Nd, Sm or Pr.

In the method according to the present invention, the above-mentioned crystalline aluminosilicate zeolite and the particular metal trap material treated with the phosphorus-containing solution are slurried by, for example kneading the metal trap material treated with the phosphorus-containing solution and the crystalline aluminosilicate zeolite, preferably in the presence of a binder.

As such binder, a binder commonly employed as a catalytic cracking catalyst for hydrocarbons, such as alumina- or silica-based sol type binder, may preferably be employed. The silica sol type binder may be prepared by neutralizing, for example water glass with mineral acids such as sulfuric acid with pH of the binder being in a range of from 1 to 4. Although the above binder remains moderately stable in an acid range of pH of not more than 4, it is instantaneously gelated in a basic range and lowered in its capability as a binder. Consequently, if the above-mentioned particular metal trap material is suspended in water without being processed in advance with a phosphorus-containing solution, the resulting suspension becomes basic by magnesia dissolved from the particular metal trap material to gelate the binder in the course of the preparation to lower the attrition resistance of the catalyst. Besides, the catalyst for catalytic cracking of hydrocarbons in which the dissolved magnesia is adsorbed on acidic points of zeolite to inhibit de-aluminum from zeolite under hydrothermal conditions affects the octane value of the product gasoline. Therefore, according to the present invention, it is necessary to treat the above-mentioned particular metal trap material with the phosphorus-containing solution for inactivating magnesia contained in the metal trap material. The proportions of the charging amounts of the particular metal trap material to the crystalline aluminosilicate zeolite may preferably be 1: 0.2 to 20 by weight ratio. The quantity of the binder employed may preferably be 2 to 20 wt % based on the total weight of the slurry. The slurry may also be admixed with clay commonly employed for a catalytic cracking catalyst, such as kaolin, bentonite, montmorillonite or halloysite. The quantity of the clay added to the slurry may preferably be 2 to 25 wt % based on the total weight of the slurry.

According to the method of the present invention, the catalyst for converting the hydrocarbons may be produced by spray-drying the slurry. Spray-drying may be carried out by a spray-dryer preferably at the temperature of 100° to 400°C.

It is most preferred that the catalyst for converting the hydrocarbons produced by the method of the present invention is composed of 10 to 40 wt % of crystalline aluminosilicate zeolite, 2 to 50 wt % of the above-mentioned particular metal trap material, optionally 5 to 50 wt % of clay and 5 to 50 wt % of silica- or alumina-based binder. It is also preferred that the bulk density, mean particle size, surface area and pore volume of the catalyst for converting hydrocarbons be 0.5 to 0.8 g/ml, 50 to 80 $\mu$m, 80 to 350 m$^2$/g and 0.05 to 0.5 ml/g, respectively.

It is possible with the method of the present invention to produce the catalyst for converting hydrocarbons having superior effects as a fluidized catalytic cracking catalyst for producing light oils, such as gasoline or kerosene, by catalytic cracking of heavy oils containing heavy metals, above all, nickel and vanadium, in a total quantity of 0.5 ppm or more.

EXAMPLES OF THE INVENTION

The resent invention will be explained with reference to the following Examples and Comparative Examples. It is to be noted that these Examples are for the sake of illustration only and by no means intended to limit the scope of the invention.

EXAMPLE 1

(A) Preparation of USY type zeolite 1 kg of Na-Y type zeolite and 2.5 kg of ammonium chloride were charged into a vessel of 60 lit. capacity and pure water was subsequently added so that the total volume was equal to 50 liters. The resulting mixture was heated to 80°C, agitated for three hours, filtered and washed with 50 liters of pure water. This sequence of operations was repeated twice and the resulting mass was dried at 110° C. and steamed at 750° C. for three hours. The above-described ion exchange operation was again carried out and the resulting mass was washed and dried to give an USY type zeolite. The crystal lattice constant of the resulting zeolite as measured in accordance with the method of ASTM D-3942-80 by X-ray diffraction was 2.450 nm.

(B) Preparation of Silica Sol 2155 g of a dilute solution of JIS No.3 water glass ($SiO_2$; concentration, 11.6%) was added dropwise to 337 g of 40 wt % sulfuric acid to produce 2492 g of silica sol with pH of 3.0.

(C) Treatent of Serpentine with phosphorus-Containing Solution 231 g of serpentine pulverized to have a mean particle size of 5 μm, were dispersed in 400 ml of pure water, 30 ml of a 85 wt % aqueous solution of phosphoric acid were added dropwise to the resulting dispersion and the pH of the resulting product was adjusted to 3.0.

(D) Preparation of Catalyst A

Into the total mass of silica sol prepared in (B) were added the total mass of serpentine treated with the phosphorus-containing solution prepared in (C), 350 g of zeolite prepared in (A) and 200 g of kaoline, and the resulting mixture was kneaded to give a slurry which was spray-dried with hot air of 250° C. using a spray drier. The resulting spray-dried product was washed with 5 lit. of 0.2 wt % ammonium sulfate at 50° C. and dried in an oven maintained at 110° C. to prepare a catalyst for converting hydrocarbons. Further, the catalyst obtained for the measurement later described was calcined at 600° C. to produce the catalyst (A). The properties and catalytic performance of the catalyst A were measured in accordance with the following method. The results are shown in Table 1.

Attrition Tests

A predetermined quantity of the catalyst was fluidized at a constant air flow rate for 30 hours. The ratio of the catalyst comminuted and scattered out of the system was measured as an attrition index by the weight method.

Catalytic Activity and Selectivity Tests

Catalytic activity and selectivity were evaluated in accordance with ASTM D-3907 MAT (micro-activity tests). For checking into the resistance of the catalyst to metal, 0.3 wt % of nickel and 0.6 wt % of vanadium were supported on the catalyst in accordance with the Mitchell's method (Ind. Eng. Chem., Prod. Res. Dev., 19, 209 (1980)) and put to MAT. That is, the catalyst was impregnated in a solution of nickel naphthate and vanadium naphthate in toluene and the solvent was evaporated and the resulting mass was calcined in air at 550° C. for three hours. For equalizing the catalyst properties with the equilibrium catalyst, the catalyst was steamed at 770° C. for six hours before putting the catalyst to MAT. The reaction conditions of MAT were WHSV of 40, catalyst/oil ratio of 3 and the reaction temperature of 515° C. The starting oil was a mixed oil of 50% of desulfurized residues and 50% of desulfurized VGO with the residual carbon being 4 wt %.

Conversion

Conversion = [(starting oil − fraction of the produced oil having the boiling point of 221° C. or higher)/starting oil]×100 (wt. %)

Research Octane Value of Gasoline

The research octane value of the gasoline generated by MAT was computed on the basis of the results of analysis by gas chromatography.

EXAMPLE 2

A catalyst B was prepared in the same way as in Example 1 except calcining the serpentine pulverized to have a mean particle size of 5 μm at 750° C., dispersing the sintered serpentine in 400 ml of pure water, dripping 40 ml of a 85 wt % aqueous solution of phosphoric acid and adjusting the pH value to 3.0 in (C) of Example 1. The catalyst (B) was put to the tests similar to those of Example 1. The results are shown in Table 1.

EXAMPLE 3

A catalyst E was prepared in the same way as in Example 1 except dispersing sepiolite pulverized to have a mean particle size of 5 μm in 400 ml of pure water, dripping 35 ml of a 85 wt % aqueous solution of phosphoric acid and adjusting the pH value to 3.0 in (C) of Example 1. The catalyst B was put to the tests similar to those of Example 1. The results are shown in Table 1.

COMPARATIVE EXAMPLE 1

The catalyst C was prepared in the same way as in Example 1 except that 231 g of serpentine was dispersed in 400 ml of pure water but was not treated with the phosphorus-containing solution. The silica sol added at this time was gelated. The catalyst C thus obtained was put to the test similar to that in Example 1. The results are shown in Table 1.

COMPARATIVE EXAMPLE 2

A catalyst D was prepared in the same way as in Example 1 except not adding the serpentine treated with the phosphorus-containing solution prepared in (C) of Example 1. The catalyst D thus obtained was put to the test similar to that in Example 1. The results are shown in Table 1.

It is seen from the results of Table 1 that the catalyst D not containing magnesium silicate minerals exhibited higher dry gas and coke yields and lower resistance to metal than the catalysts A, B and C containing magnesium silicate minerals. Besides, the catalyst C in which serpentine was not treated with phosphorus exhibited poor attrition resistance because silica gel was gelated. The octane value of the gasoline was also lowered slightly. Conversely, satisfactory results were obtained with the catalysts A, B and C.

TABLE 1

| Catalyst | | | Ex. 1 A | Ex. 2 B | Comp. Ex. 1 C | Comp. Ex. 2 D | Ex. 3 E |
|---|---|---|---|---|---|---|---|
| Catalyst Composition | Magnesium silicate minerals | wt. % | 20 | 20 | 20 | — | 20 |
| | Kaolin | wt. % | 20 | 20 | 20 | 40 | 20 |
| | Amorphous silica | wt. % | 25 | 25 | 25 | 25 | 25 |
| | Zeolite | wt. % | 35 | 35 | 35 | 35 | 35 |
| Results of MAT | Conversion | wt. % | 71.3 | 72.5 | 71.2 | 50.8 | 70.3 |
| | Gasoline yield | wt. % | 50.7 | 51.3 | 50.8 | 39.5 | 49.5 |
| | Coke yield | wt. % | 4.7 | 5.0 | 4.7 | 6.0 | 5.2 |
| | Dry gas yield | SCF/B | 210 | 205 | 215 | 320 | 224 |
| | GC octane value | | 91.5 | 91.7 | 89.9 | 90.5 | 91.6 |
| | Attrition index | | 2 | 2 | 13 | 3 | 2 |

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scopr of the following claims.

What is claimed is:

1. A method of producing a catalyst for converting hydrocarbons comprising spray-drying a slurry containing crystalline aluminosilicate zeolite and magnesium silicate mineral, said magnesium silicate mineral functioning as a metal trap containing 10 to 60 wt % of magnesium as an oxide, said magnesium silicate mineral having been treated with a phosphorus-containing solution.

2. The method as defined in claim 1 wherein said crystalline aluminosilicate zeolite is a porous substance having a three-dimensional skeleton structure having a uniform pore size of 0.4 to 1.5 nm.

3. The method as defined in claim 1 wherein said crystalline aluminosilicate zeolite is natural crystalline aluminosilicate zeolite and wherein said natural crystalline aluminosilicate zeolite is selected from the group consisting of gmelinite, chabazite, dachiardite, clinoptilolite, faujasite, heulandite, analcite, levynite, erionite, sodalite, cancrinite, ferrierite, brewsterite, offretite, natrolite, mordenite, and mixtures thereof.

4. The method as defined in claim 1 wherein said crystalline aluminosilicate zeolite is synthetic crystalline aluminosilicate zeolite and wherein said synthetic crystalline aluminosilicate zeolite is selected from the group consisting of zeolite X, zeolite Y, zeolite A, zeolite L, zeolite ZK-4, zeolite B, zeolite E, zeolite F, zeolite HJ, zeolite M, zeolite Q, zeolite T, zeolite W, zeolite Z, zeolite α, zeolite β, zeolite ZSM, zeolite ω and mixtures thereof.

5. The method as defined in claim 4 wherein said synthetic crystalline aluminosilicate zeolite is ultra-stable Y zeolite (USY zeolite) having a lattice constant of 2.425 to 2.460 nm obtained by abstracting aluminum from Y zeolite.

6. The method as defined in claim 1 wherein sodium ions and protons contained in said crystalline aluminosilicate zeolite are ion-exchanged with ions selected from the group consisting of monovalent lithium ions, bivalent calcium cations, bivalent magnesium cations, bivalent cations of Fe, trivalent cations of Fe, bivalent cations of Mn, cerium ions, lanthanum ions, neodymium ions, samarium ions, praseodymium ions and mixtures thereof.

7. The method as defined in claim 1 wherein said magnesium silicate mineral is selected from the group consisting of serpentine, olivine, augite, amphibole, sepiolite and mixtures thereof.

8. The method as defined in claim 1 wherein said magnesium silicate mineral is selected from the group consisting of forsterite obtained by calcining said magnesium silicate mineral, enstatite obtained by calcining said magnesium silicate mineral and mixtures thereof.

9. The method as defined in claim 1 wherein said magnesium silicate mineral is calcined at a temperature not exceeding 800° C.

10. The method as defined in claim 1 wherein said magnesium silicate mineral is of particle size not more than 40 μm.

11. The method as defined in claim 1 wherein said phosphorus-containing solution is selected from the group consisting of an aqueous solution of phosphoric acid, a mixed aqueous solution of phosphoric acid and ammonia, an aqueous solution of ammonium phosphate, an aqueous solution of ammonium dihydrogen phosphate, an aqueous solution of diammonium hydrogen phosphate and mixtures thereof.

12. The method as defined in claim 1 wherein a pH value of the phosphorus-containing solution is adjusted so that the pH value of the phosphorus-containing solution following treatment with said phosphorus-containing solution is in a range of from 1 to 4.

13. The method as defined in claim 1 wherein said phosphorus-containing solution is in an amount of 0.5 to 20 parts by weight to 100 parts by weight of said magnesium silicate mineral based on phosphorus atoms.

14. The method as defined in claim 1 wherein said slurry is obtained by kneading said crystalline aluminosilicate zeolite, said magnesium silicate mineral and a binder.

15. The method as defined in claim 14 wherein said binder is selected from the group consisting of an alumina sol type binder, a silica sol type binder and mixtures thereof.

16. The method as defined in claim 14 wherein said binder is in an amount of 2 to 20 wt % based on total weight of the slurry.

17. The method as defined in claim 1 wherein a weight ratio of charging quantities of said magnesium silicate mineral to said crystalline aluminosilicate zeolite is 1: 0.2 to 20.

18. The method as defined in claim 1 wherein said slurry contains clay selected from the group consisting of kaoline, bentonite, montmorillonite, halloysite and mixtures thereof in an amount of 2 to 25 wt % based on total weight of the slurry.

19. The method as defined in claim 1 wherein said slurry is spray-dried at 100° to 400° C.

* * * * *